United States Patent
Kuga et al.

(10) Patent No.: US 6,816,273 B1
(45) Date of Patent: Nov. 9, 2004

(54) IMAGE FORMING METHOD

(75) Inventors: Masato Kuga, Kawasaki (JP); Shingo Shiramura, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,392

(22) Filed: Feb. 18, 2000

(51) Int. Cl.$^7$ .......................... G06F 15/00; G06F 3/12; G06K 1/00; G06K 15/02

(52) U.S. Cl. .................. 358/1.15; 358/468; 358/1.16; 358/1.9; 358/409

(58) Field of Search .......................... 347/123; 399/28, 399/82; 358/52.1, 1.16, 296, 468, 1.15, 1.9; 371/16.4; 709/203

(56) References Cited

U.S. PATENT DOCUMENTS 5,175,735 A * 12/1992 Dahlby et al. ............... 714/2
5,206,735 A * 4/1993 Gauronski et al. ......... 358/296
5,970,224 A * 10/1999 Salgado et al. ........... 358/1.16

* cited by examiner

*Primary Examiner*—Edward Coles
*Assistant Examiner*—David L Jones
(74) *Attorney, Agent, or Firm*—Foley & Lardner LLP

(57) ABSTRACT

An image forming method applied to an image forming apparatus including an image inputting unit for inputting image data, a memory for storing the image data inputted from the image inputting unit, and a printer for forming the image data on an image forming medium. At a start of image forming processing on the image data inputted from the image inputting unit, if the printer is performing any other processing, all the image data inputted by the image inputting unit is stored in the memory. The printer performs image forming processing on the image data stored in the memory after completing performing the other processing.

6 Claims, 6 Drawing Sheets

IMAGE FORMING METHOD

BACKGROUND OF THE INVENTION

This invention relates to an image forming method applied to an image forming apparatus, such as a digital copier, having not only a copying function but also a facsimile function or a printer function.

Conventionally, the digital copier has a scanner, printer, memory, image processing section, etc. The scanner optically reads out a document and converts its image to an electric signal. The image processing section applies a variety of image processing to an image data read out by the scanner. The memory accumulates the image data to which the image processing is applied by an image processing section. The printer subjects the image data which is stored in the memory to a laser electrophotographic process to form an image.

The digital copier thus configured can realize not only a copying function equal to that of an analog copier but also a facsimile transmitting function, facsimile receiving function and printer function.

The facsimile transmitting function and facsimile receiving function are realized by having a facsimile communication section connected to a public network. The facsimile transmitting function allows a document image to be read out by a scanner and the image to be transmitted by the facsimile communication section through the public network. The facsimile receiving function allows the image which is transmitted by the facsimile communication section through the public network to be received and the received image to be printed by a printer.

The printer function is realized by having an image communication means relative to a host computer as an external apparatus. The printer function allows the print data to be received by the image communication means and the received print data to be printed.

In this way, a variety of processing such as an image transmission, received data printing, etc., are realized by having a common use of the scanner or printer, etc.

Further, the digital copier has a memory for storing the image. It is therefore, not necessarily required that the scanner and printer be operated in a synchronized relation as in an analog copier. For example, the digital copier transmits the image which is read out by the scanner. In parallel with this processing, the digital copier can print, by a printer, the print data received by the print communication section from an external apparatus. In this way, the digital copier enables the scanner and printer to execute separate types of processing (jobs). That is, the digital copier can perform "multi-function operations" by which a plurality of processing are done simultaneously.

The above-mentioned parallel operations are performed as if there occurred a single job request for both the scanner and printer. In the variety of processing performed by the digital copier, however, there is sometimes the case where the scanner or printer, etc., is shared. If, therefore, the scanner or printer is shared, when a request for a job is generated, the scanner or printer cannot perform any other job unless a job being executed is terminated. In the case where, for example, copy processing is to be performed during printing processing by the printer function, copying cannot be implemented until the printing of print data during printing by the printer is completed. This occurs because the print processing under the printer function and copy function under the copying function share the printer.

Further, the digital copier, having a memory, does not require a complete synchronization operation as in the case of the analog copier. That is, even if the printing of the image is not executed at a time of inputting the image, printing can be executed after the image has been stored in the memory. In this way, the operation condition under which the image inputting processing and image printing processing are separately operated is called a "completed type". In the copy processing of the "completed type", all the document image is scanned by the scanner. The image thus scanned by the scanner is stored in the memory.

Then, after all the image has been stored in the memory, the printer prints images sequentially read out from the memory.

On the other hand, the digital copier can effect the inputting of the image and printing of the input image in a synchronized way. The operation condition under which the image inputting processing and image printing processing are done in a synchronized way is called a "sequential type". This "sequential type" speeds up a time of starting the print of the image when being compared with the "completed type". When, therefore, a time (first copying time) from the start of inputting the image to the end of printing the image is intentionally made somewhat shorter, the "sequential type" operation condition is used. For example, the "sequential type" copy processing performs, in parallel with the scan processing of the image by the scanner, print processing of the scanned image.

Some scanner used in the digital copier has an auto-document feeder (ADF) for feeding a plurality of documents sequentially to a scanning position. Some digital copier has a mode (usually, a single-sided/single-sided operation mode) in which it sequentially reads out the single side surface of the document with the use of the ADF and effects a printing on a single side surface of a copy sheet. In this case, the scan processing of the document by the scanner and print processing of the image by the printer are done in a synchronized relation. By doing so, a better productive operation is realized in a shorter time from the starting of scanning to the completion of printing.

In the above-mentioned "sequential type" copy processing, the scanner and printer are occupied under one copy processing while performing at least a scan operation. During the execution of the "sequential type" copy processing, therefore, the scanner- or printer-utilizing processing cannot be done in a parallel operation.

In the case where the digital copier effects a "sequential type" copy operation and performs a parallel operation against the variety of processing, there are the following conditions.

(1) A copy operation is effected during the printing of the received print data.

(2) A copy operation is effected during the printing of the received facsimile document.

(3) A facsimile transmitting operation is done during copying.

In the case of (1) to (3), in order to perform the copy operation in the "sequential type" mode, the scanner and printer are operated in a synchronized way while performing at least a scanning operation. For this reason, the scanner and printer of the digital copier are occupied by one copying job. During the copy processing, therefore, it is not possible to perform print processing on the print data or on received data under a facsimile communication, document scan processing under which a facsimile is transmitted, etc.

For this reason, there are two conventional methods as will be set out below. One control method is by giving a priority to the copy processing. In this method, the processing done by the printer is once stopped at a time of starting an operation of copy processing.

Then, when the start of the copy processing is designated, the copy processing is implemented in the "sequential type" mode. When the copy processing is terminated, a state is set in which the next processing can be done. Usually, here, in the case where, in a predetermined time, the user does nothing relating to the next processing, the interrupted printing of the received data is resumed.

In such control method, the scanner and printer are occupied by the copy processing during a predetermined time from the starting of the operation by the user to the termination of the copy processing. Thus, the printer takes more practical inoperative time and more loss time. Further, since the processing now performed for the copy processing is stopped and resumed, complex control is involved.

The second control method is by giving a sequential priority to a print request. Even if the copy processing is designated, this control method gives a sequential priority order in which a request for the processing by the printer occurs. In this case, the processing is performed in the "completed type" mode. For example, the copy processing is such as to separately performed the scan processing by the scanner and print processing by the printer. That is, the copy processing is done by first performing document scan processing by the scanner. All document images read out by the scan processing are stored in the memory. When the scan processing is completed, a request is made for the printer to perform the print processing on the image stored in the memory. In this case where there are any processing executed by the printer and any processing now waiting for printing, the print request is such as to start the print processing of the copy processing after these of processing has been completed.

In such a control method, the copying processing becomes at all times a "completed type" operation. Even if, therefore, the copy processing is independently implemented, there arises the problem that the copy processing is made lower in productivity. If there are a plurality of processing waiting for printing, printing is started after these of print processing are all completed. In the case where, therefore, many of processing wait for printing, there arises a problem that the printing start of the copy processing is delayed.

BRIEF SUMMARY OF THE INVENTION

As set out above, the image forming apparatus poses a problem that it has to adopt any one of a first operation condition under which it is not possible to perform a parallel operation during image formation but it is possible to achieve a higher productivity and a second operation condition under which it is possible to perform the parallel operation during the image formation but it is not possible to achieve any higher productivity. In order to solve this problem, the present invention is achieved according to which a parallel operation can be realized without lowering that productivity.

An image forming method of the present invention applied to an image forming apparatus having image inputting means for inputting image data, a memory for storing image data inputted from the image inputting means and a printer for forming the image data on an image forming medium, the method comprising the steps of, when, at a start of image forming processing on image data inputted from the image inputting means, the printer performs any other processing, after inputting all image data as an object of the image forming processing by the image inputting means and storing the image data in the memory, enabling the printer to perform image forming processing on the image data stored in the memory.

Another image forming method of the present invention applied to an image forming apparatus having image inputting means for inputting image data and a printer for forming the image data on an image forming body, the method comprising the steps of, judging whether or not, at a start of image forming processing on image data inputted by the image inputting means, the printer perform any other processing; when it is judged that the printer performs no other processing, setting a first operation condition or second operation condition in accordance with processing contents of the image forming processing, the first operation condition being a condition under which image data as an object of the image forming processing is sequentially inputted by the image inputting means and image forming processing is performed on the image data sequentially inputted by the printer and the second condition being a condition under which, after inputting all image data as an object of the image forming processing by the image inputting means and storing the image data in the memory, the image forming processing is performed by the printer on the image data stored in the memory; when it is judged that the printer performs any other processing, setting the operation condition of the image forming processing to the second operation condition; and performing the image forming processing based on the set operation condition.

Another image forming method of the present invention applied to an image forming apparatus having a scanner for reading out a document image, image receiving means for receiving image data via a communication network, a memory for storing the image data inputted by the scanner or image receiving means and a printer for forming the image data on an image forming medium, the method comprising the steps of, at a start of image forming processing on the image data inputted from the scanner, judging whether or not the printer performs processing on the image data received from the image receiving means; when it is judged that the printer performs no processing on the image data received from the image receiving means, sequentially inputting image data as an object of the image forming processing by the scanner and performing image forming processing on the image data sequentially inputted by the printer; and, when it is judged that the printer now performs processing on the image received from the image receiving means, after the reading out all the image data as an object of the image forming processing by the scanner and storing the image data in the memory, enabling the printer to perform image forming processing on the image data stored in the memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention will be explained below with reference to the accompanying drawing.

Figure 1:
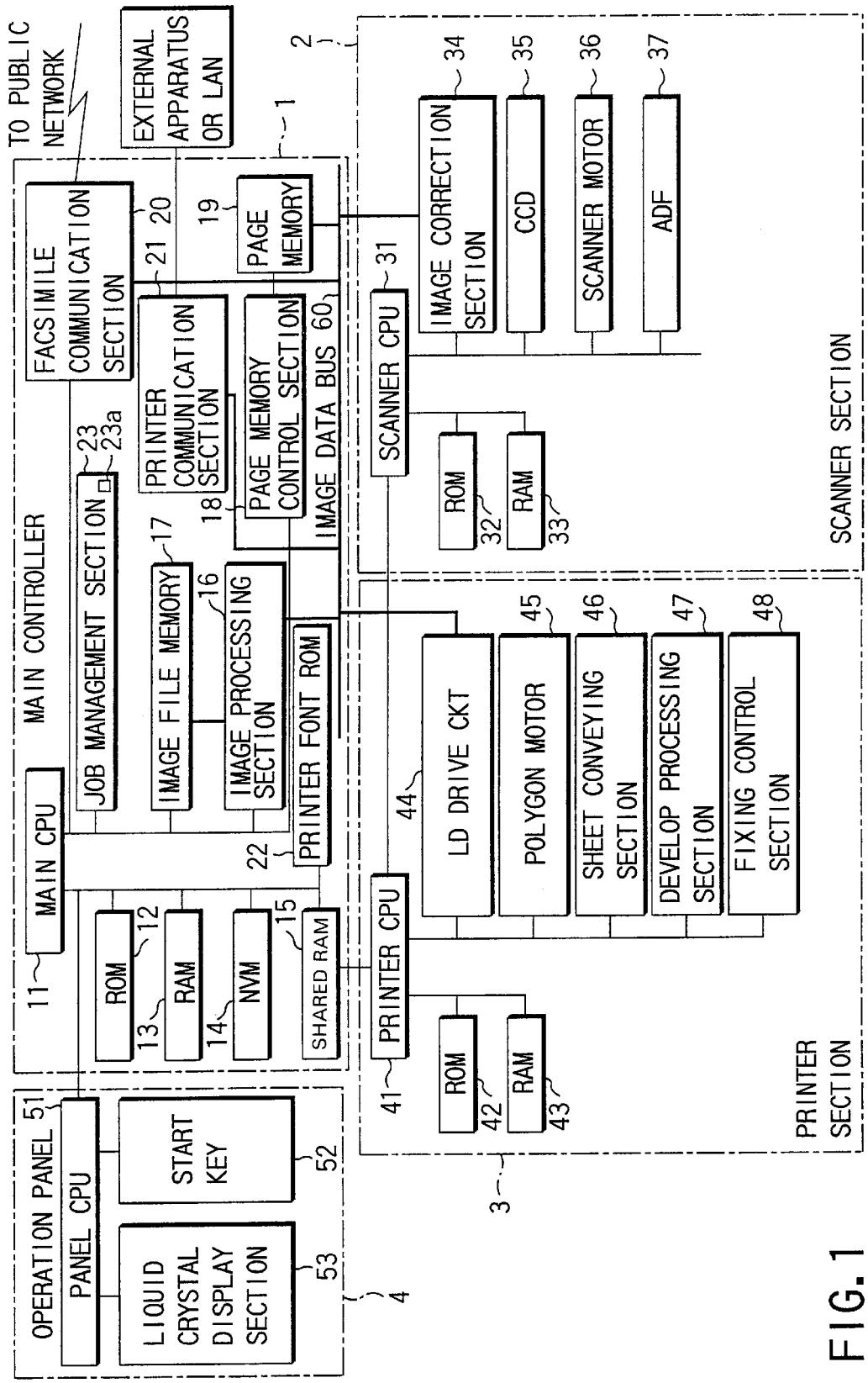
FIG. 1 is a block diagram showing an inner structure of a digital copier according to the present invention.

FIG. 1 is a block diagram schematically showing an electrical connection of a digital copier and a flow of signals for control.

As shown in FIG. 1, the digital copier comprises a main controller 1, scanner section (image input means) 2, printer section 3 and an operation panel 4.

The main controller 1 comprises a main CPU 11, ROM 12, RAM 13 NVM 14, shared RAM 15, image processing section 16, image file memory 17, page memory control section 18, page memory 19, facsimile communication section (image input means, image receiving means) 20, printer communication section (image inputting means, image receiving means) 21, printer font ROM 22, job management section 23, etc.

The main CPU 11 controls the main controller 1 as a whole. The ROM 12 stores various control programs. RAM 13 stores data temporarily. The NVM (nonvolatile RAM) 14 is comprised of a nonvolatile memory backed up by a battery (not shown). The shared RAM 15 is used to conduct a two-way communication between the main CPU 11 and a printer CPU 41.

The image processing section 16 is comprised of an image processing circuit and performs image processing, such as trimming, masking, image compression and expansion, etc. The image processing section 16 compresses image data read out by the scanner section 2 and converts it to an image file. Further, the image processing section 16 allows image data which is received by the facsimile communication section 20 or printer communication section 21 to be converted to an image file.

The image file memory 17 stores image data filed by the image processing section 16. The page memory control section 18 controls the page memory 19. The page memory 19 stores image data read out by the scanner section 2 and image data printed by the printer section 3. In the case where a parallel operation of image input processing from the scanner section 2 as an image input means, facsimile communication section 20 or printer communication section 21 and image forming processing by the printer section 3 is carried out, a storage area of the image data for image inputting and storage area of the image data for image formation are secured in the page memory 19.

The facsimile communication section 20 allows the transmission and reception of the facsimile data via a communication network such as the public network. The facsimile communication section 20 converts received facsimile data to image data and outputted it to the page memory 19.

The printer communication section 21 receives print data from an external apparatus such as a personal computer, etc., connected via a printer cable or a local area network (LAN).

The printer font ROM 22 stores font data corresponding to code data such as a character code, etc.

The printer communication section 21 develops the print data which is received from the external apparatus to image data on the basis of the font data of the font ROM 22. The image data is outputted to the page memory 19. The print data comprises code data, such as a character code, etc., character size, control data, such as a resolution, or bit map data, etc.

The job management section 23 manages the processing performed by each part in each job unit. For example, copy processing is managed as a copying job. The coping job comprises a job (read-out job) reading out a document by the scanner section 2 and job(print job) printing an image read out by the printer section 3. Further, the print processing of the print data received from the printer communication section 21 is managed as a printer job. The printer job comprises a job for receiving the print data by the printer communication section 21 and a job (print job) for printing by the print section 3. Further, the job management section 23 has a print queue 23a at which the print job is registered (recorded).

Then the scanner 2 will be explained below. The scanner section 2 comprises a scanner CPU 31, ROM 32, RAM 33, image correction section 34, CCD sensor (CCD) 35, scanner motor 36, auto-document feeder (ADF) 37, etc.

The scanner CPU 31 controls the scanner section as a whole. The ROM 32 stores a control program, etc. The image correction section 34 comprises a line sensor, A/D conversion circuit, shading correction circuit, gamma correction circuit, etc. The image correction section 34 receives an image signal from the CDD 35. The image correction section 34 applies an A/D conversion and correction to the received image signal and outputs resultant image data to the page memory 19. The CCD 35 is driven under control of a CCD driver (not shown). The scanner motor 36 has an exposure lamp, mirror, etc. mounted thereon and drives a unit (not shown) for exposing a document with light. The ADF 37 feeds a plurality of document page sheets sequentially to a read-pout position.

Then the printer section will be explained below. The printer section 3 comprises a printer CPU 41, ROM 42, RAM 43, LD drive circuit 44, polygon motor 45, sheet conveying section 46, develop processing section 47, fixing control section 48, etc.

The printer CPU 41 controls the printer section 3 as a whole. The ROM 42 controls the light emission of a semiconductor laser (not shown) so as to form an electrostatic latent image on a photosensitive drum (not shown) serving as an image carrier. The polygon motor 45 guides light from a semiconductor laser to the photosensitive drum. The polygon motor 45 has its rotation controlled by a polygon motor drive circuit (not shown). The sheet conveying section 46 controls the conveying of the sheet as an image forming medium in the digital copier. The develop processing section 47 performs charging of the drum, develop processing and transferring of an image to the sheet. The fixing control section 48 controls a fixing unit (not shown) for fixing the image transferred to the sheet.

The operation panel 4 comprises a panel CPU 51, start key 52, liquid crystal display section 53, etc. The panel CPU 51 controls the operation panel 4 as a whole. The start key 52 designates the starting of coping or the starting of a facsimile transmission, etc. The liquid crystal display section 53 is comprised of a liquid crystal panel with a touch panel incorporated therein.

Then an explanation will be made below about the various functions of the digital copier thus constructed.

This digital copier has, in addition to the copying function, a facsimile transmitting function, facsimile receiving function and printer function.

The copy processing under the above-mentioned copying function comprises reading out a document image through the scanner section 2 and printing the read-out image on the image forming medium through the printer section 3. Under the copying function, therefore, the scanner section 2 and printer section 3 are utilized.

The facsimile transmitting operation under the facsimile transmitting function comprises reading out the document image through the scanner section 2 and externally transmitting the read-out image, via the public network, which comes from the facsimile communication section 21. Under the facsimile transmitting function, therefore, the copying function and scanner section 2 are shared.

The facsimile receiving operation under the above-mentioned facsimile receiving (printing) function allows the data which is received via the public network from the facsimile communication section 21 to be printed by the printer section 3. Under the facsimile receiving function, therefore, the copying function and printing section 3 are shared.

The printing operation under the printer function allows the print data which is received from the printer communication section 22 to be printed by the printer section 3. Under the printer function, therefore, the copying function and printer section 3 are shared.

As shown above, the various executable functions of the digital copier are performed by sharing the scanner section or printing section, etc., which is used under the copying function.

The digital copier performs various kinds of processing under the above-mentioned functions in accordance with any of the sequential type (synchronous) or completed type (nonsynchronous) operation condition.

Figure 2:
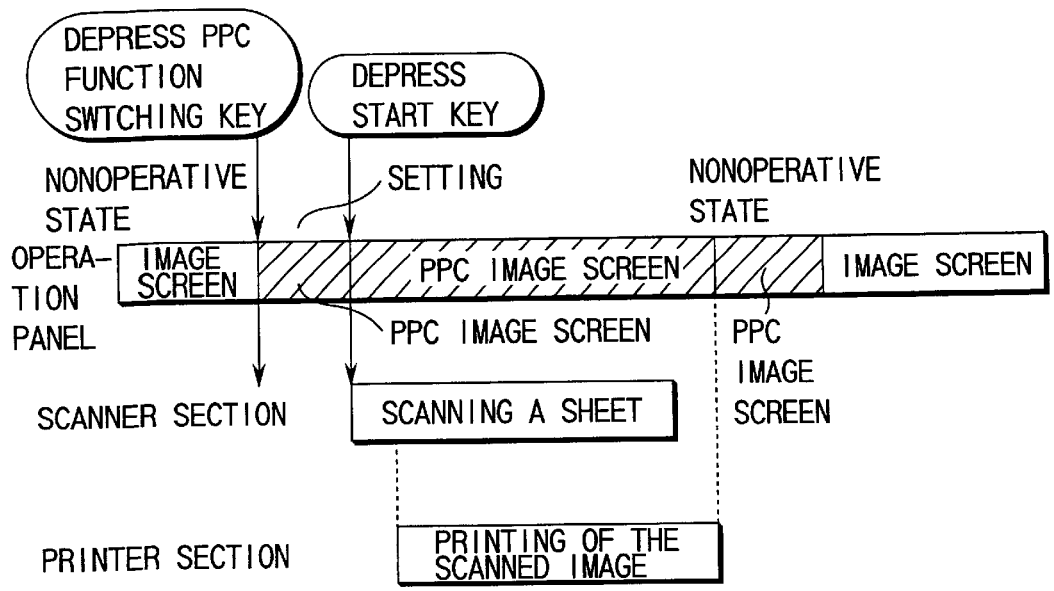
FIG. 2 is a view for explaining a sequential type copying operation.

These sequential type (first operation condition) is the operation condition under which a plurality of resources, such as the scanner section 2 and printer section 3, are operated in a synchronous way. In the case where, for example, the copy processing is operated under the "sequential type" operation condition, an operation is done with the scanner section 2 and printer section 3 shychronized as shown in FIG. 2.

That is, under the "sequential type" copy processing, a first page printing is started at a time point when a document image corresponding to the first page is read out by the scanner section 2 as the image inputting means. The document image corresponding to a second page, et. seq., is such that the respective document page is read out through the scanner section 2 and printed by the printer section 3. Under the "sequential type" operation, the scanner section 2 and printer section 3 are occupied during the performing of the copy processing.

Further, the "completed type" (second operation condition) is the operation condition under which a plurality of resources are operated in the nonsynchronous way. If, for example, the copy processing is done under the "completed type" condition, the scanner section 2 and printer section 3 are operated in a nonsynchronous way.

That is, the copy processing under the "completed type" operation condition is such that, after the completion of the reading of images of all document page sheets by the scanner section 2 as the image inputting means, the image of the first page starts to be printed. Under the "completed type" operation, the scanner section 2 and printer section 3 are not simultaneously occupied during the performing of the copy processing. During the reading of the document by the scanner 2, the printer section 3 can perform the printing of an image in other than the copy processing.

In the digital copier, the processing operation condition can be set by being selected from the "sequential type" and "completed type" operations.

When, as shown in FIG. 2, a printing job request is made for the printer section 3, unless there is any printing job in the printing queue 23a, the printing job is operated independently. In this case, the printing job is performed based on the decided operation condition and in accordance with the processing content.

Figure 3:
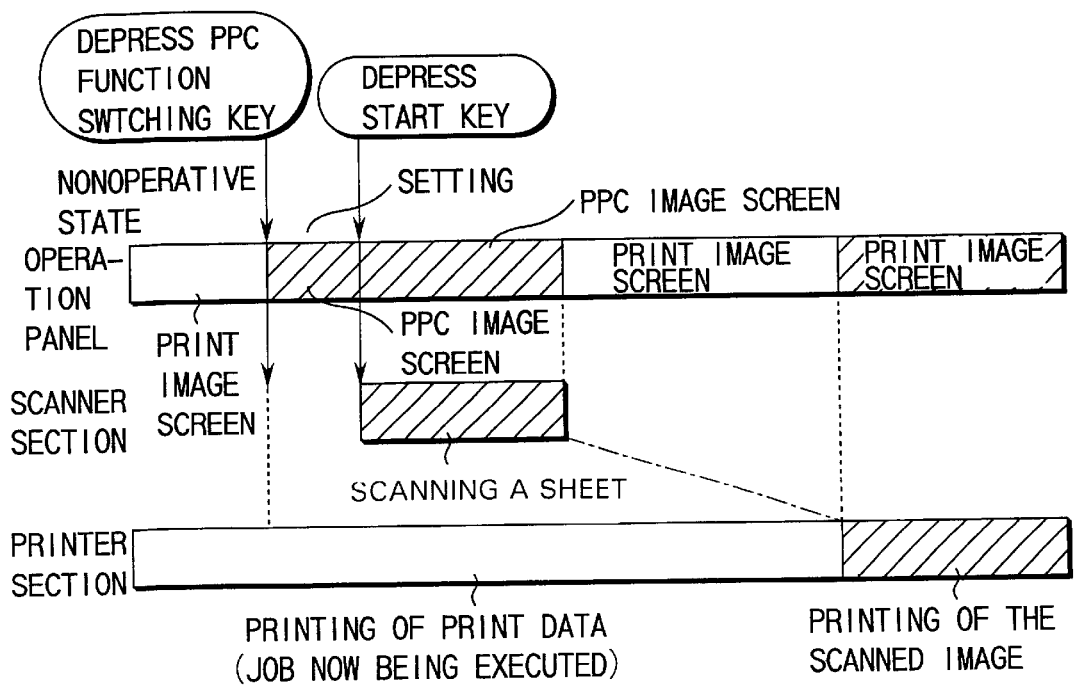
FIG. 3 is a view for explaining a completed type copying operation.

When, as shown in FIG. 3, a printing job request is made for the printer section 3, if there is a printing job in the printing queue 23a, the operation condition is determined in accordance with the operation situation of the printer section 3. Let it be assumed that, for example, the operation condition of the copy processing is the "sequential type". If, in this case, upon the performance of the copy processing, the printer section 3 performs any other processing, the operation condition of the copy processing is changed to the "completed type".

When, as set out above, the processing utilizing at least the printer section is started, the operation condition of the processing can be changed in accordance with the operation situation of the printer section. By doing so it is possible to effect control under which the printer section can be most efficiently operated.

Figure 4:
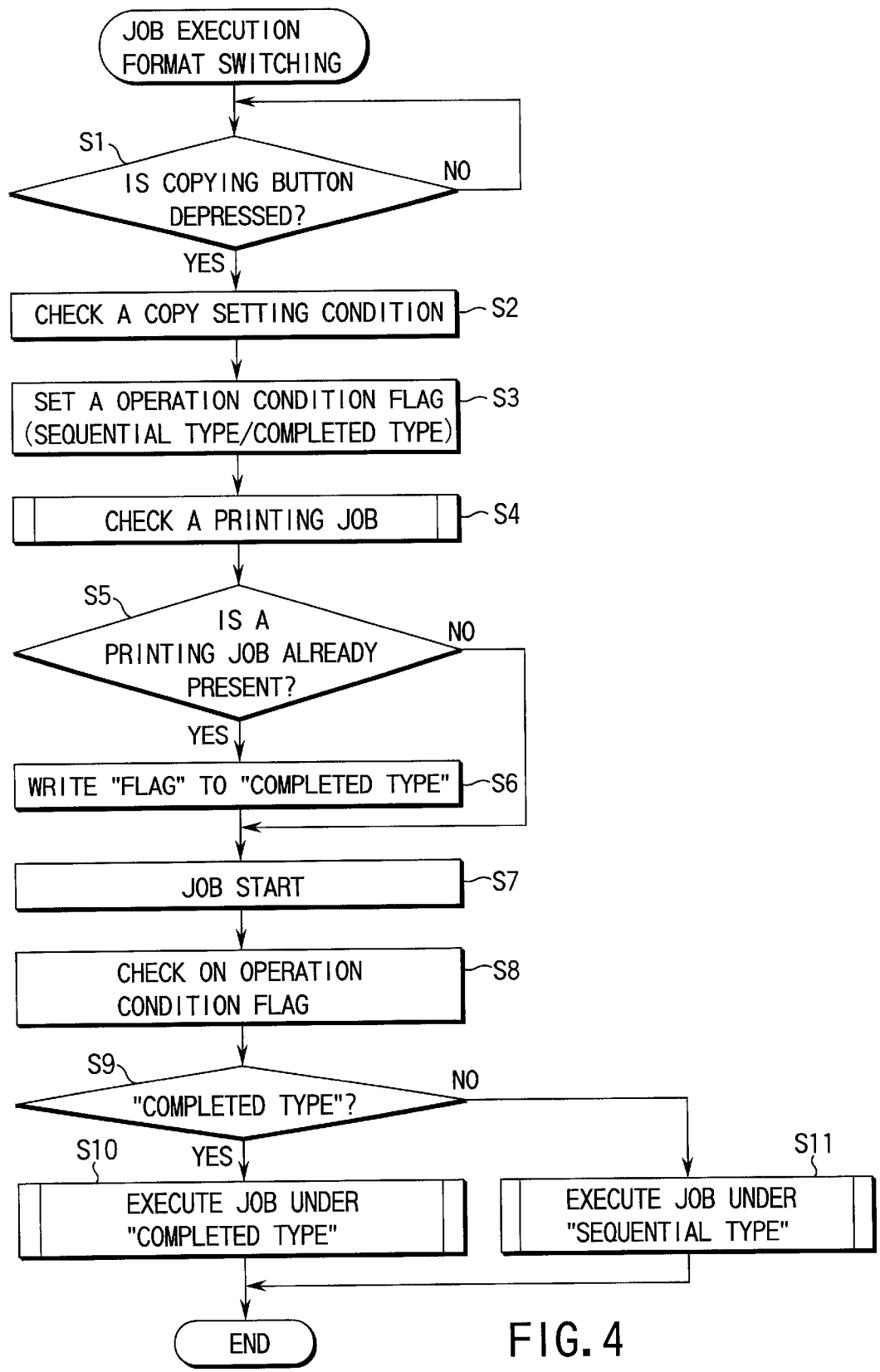
FIG. 4 is a flow chart for explaining an operation when a copying instruction is made.

The operation involved when the copy processing is designated will be explained below with reference to a flow chart shown in FIG. 4. First, the user sets the copy processing condition on the operation panel 4. When the setting of the copy processing condition is completed, the user depresses the start key 52. Then the main CPU 11 judges from a signal from the panel CPU 51 that the start key 52 was depressed (step S1).

When it is judged that the start key was depressed, the main CPU 11 checks the setting condition of the copy processing (step S2). The main CPU 11 decides the operation condition of the copy processing on the basis of the setting condition of the copy processing. The operation condition of the copy processing is such as to decide any of the "sequential type" operation or "completed type" operation. In the case where, for example, the setting condition of the copy processing is a "one-side" reading and "one-side" printing of the document under the ADF 37, the main CPU 11 decides the operation condition of the copy processing as being a "sequential type" operation.

Based on a result of decision, the main CPU 11 prepares a copying job where the operation condition flag as to whether the sequential type or completed type is involved is set (step S3).

Then, the main CPU 11 checks the printing queue 23a (step S4). By this checking, the main CPU 11 judges whether or not a job is already present in the printing queue 23a (step S5). If, here, there is a job in the printing queue 23a, a job registered at the highest position of the printing queue 23a is now being performed. That is, if the job is present in the printing queue 23a, the printer section 3 is in a state occupied by the now performing job.

In the case where it is judged that there is a job in the printing queue 23a, the main CPU 11 changes the operation condition flag of the copying job to the "completed type" (step S6). Therefore, in the case where, at step S3 above, the operation condition flag of the copying job is set to the "sequential type", the operation condition flag is changed to the "completed type".

If, at step S5 above, it is judged that there is no other job in the printing queue 23a, the main CPU 11 starts a copying job on the basis of the set operation condition (step S7). If, at step S6 above, the operation condition flag of the copying job is changed to the "completed type", the main CPU 11 starts the copying job under the completed type condition (step S7).

At the start of the copying job, the main CPU 11 checks the operation condition flag of the copying job (step S8). The main CPU 11 judges whether or not the operation condition flag of the copying job is the "completed type" (step S9).

If it is judged that the operation condition is the "completed type", the main CPU 11 performs a copying job under the "completed type" (step S10). If it is judged that the operation condition flag is not the "completed type", that is, the operation condition is the "sequential type", the main CPU 11 performs the copying job under the sequential type (step S11).

If, as set out above, at the generation of the copying job, there is a job in the printing queue, the operation condition of the copying job is the "completed type". According to whether or not there is any processing during printing or at a printing wait time, the operation condition can be set so as to allow the scanner section and printer section to be operated efficiently.

Figure 5:
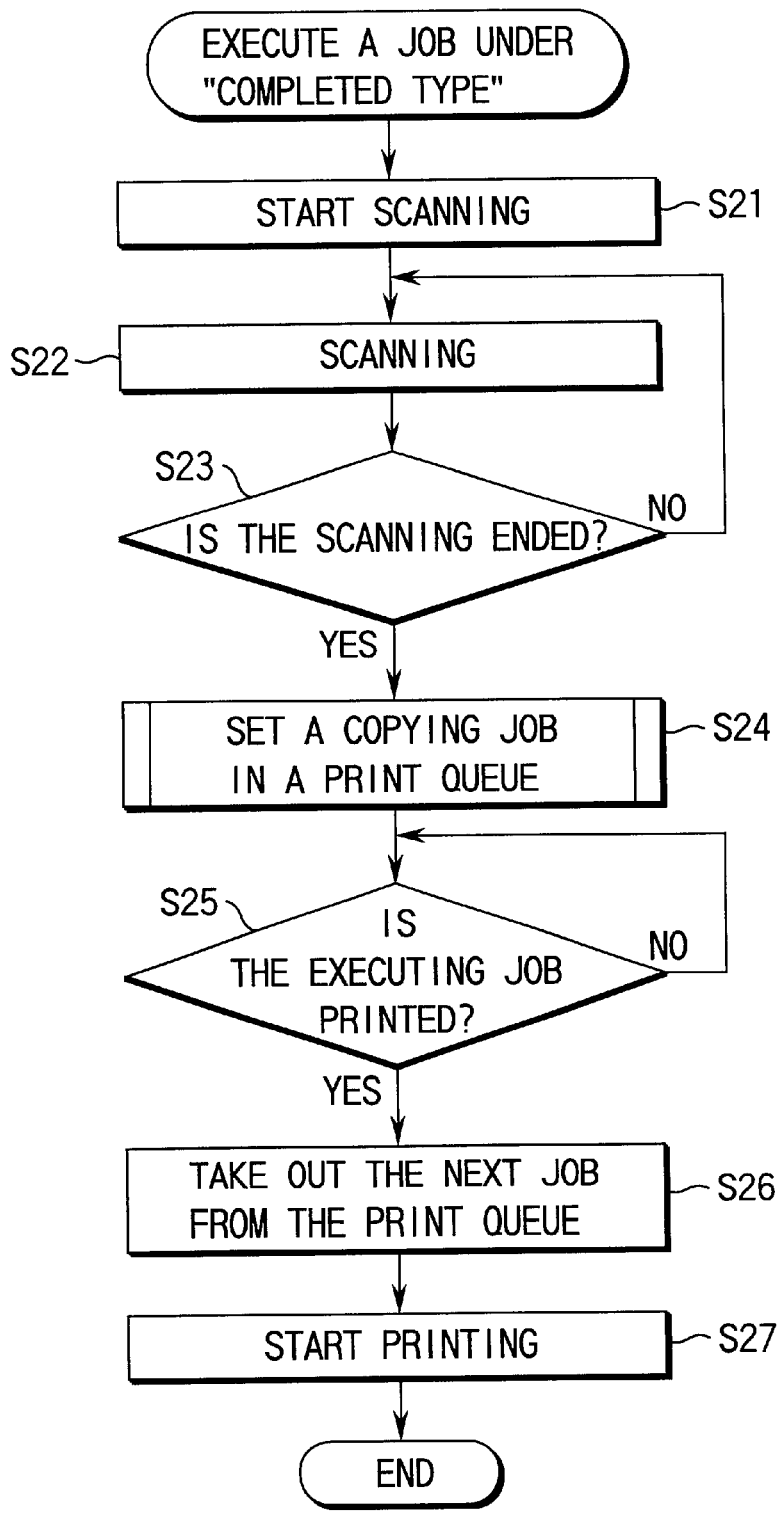
FIG. 5 is a flow chart for explaining the completed type copy processing.

Then the operation at the performing of the copying job under the completed type will be explained with reference to a flow chart shown in FIG. 5.

At the generation of a copying job under the completed type, the main CPU 11 starts scan processing under the copying job (step S21). Those images read out by the scan processing are formed as an image file and sequentially stored in the image file memory 17 (step S22). By doing so, when the images of all pages are stored in the image file memory 17, the main CPU 11 completes scan processing under the copying job (step S23).

At the completion of the scan processing, a print processing request is made for the copying job. The main CPU 11 sets the copying job to the printing queue 23a (step S24).

Thereafter, when the printer section 3 ends the now performing job (step S25), the main CPU 11 judges whether or not any copying job is present in the printing queue 23a. If it is judged that the copying job is present, the copying job is preferentially taken out from the printing queue 23a as the next job (step S26). When the copying job is taken out from the printing queue 23a, the main CPU 11 starts the print processing under the copying job (step S27). By doing so, the images accumulated in the image file memory 17 are sequentially read out and print-processed by the printer section 3.

As set out above, when the copy processing is performed, if the printer section is now being operated, the operation condition of the copy processing is changed to the completed type so as not to prevent the operation of the printer section. By doing so, the scanner section and printer section can be smoothly operated without lowering the productivity at a time of the copy processing.

When the printer section is now being operated at the performance of the copy processing, the operation condition of the copy processing is changed to the completed type and, when the printer section ends the now performing processing, the printing of the copy processing is performed in preference to the processing now waiting for printing. By doing so, it is possible to, without lowering the productivity, smoothly operate the scanner section and printer section and preferentially perform the copy processing.

Then an explanation will be made about a practical example of the printing queue 23a below.

The printing queue 23a allows various practical arrangements. For example, those jobs for which a printing request is made are sequentially registered in the printing queue 23a. In this case, when the job is taken out, it is judged whether or not any priority job from the printing queue 23a is present. If it is judged that the priority job is present, the priority job is preferentially taken out. If any priority job is not present, the jobs are taken out in the order of their being registered.

Hereinafter, an explanation will be made of a practical example of the printing queue 23a which is used when a given copying job is made in preference to any other job.

Figure 6:
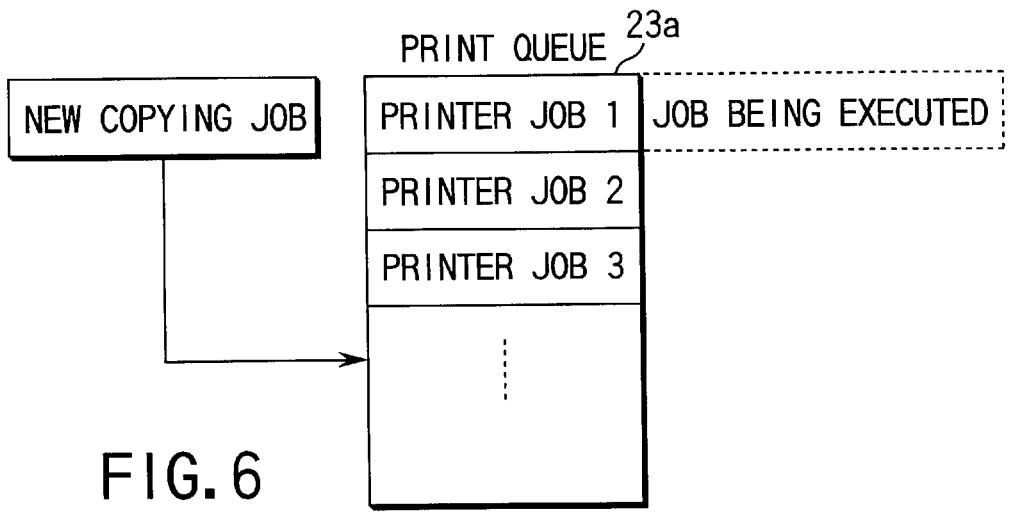
FIG. 6 shows an arrangement of a printing queue.
Figure 7:
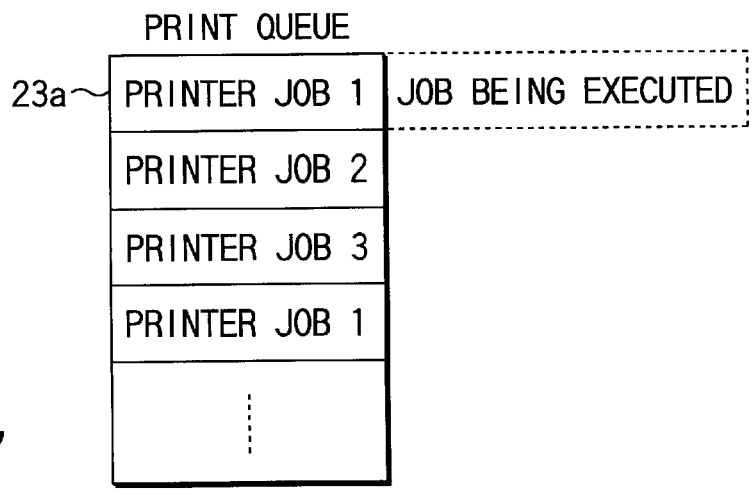
FIG. 7 is a view showing an arrangement of a printing queue.
Figure 8:
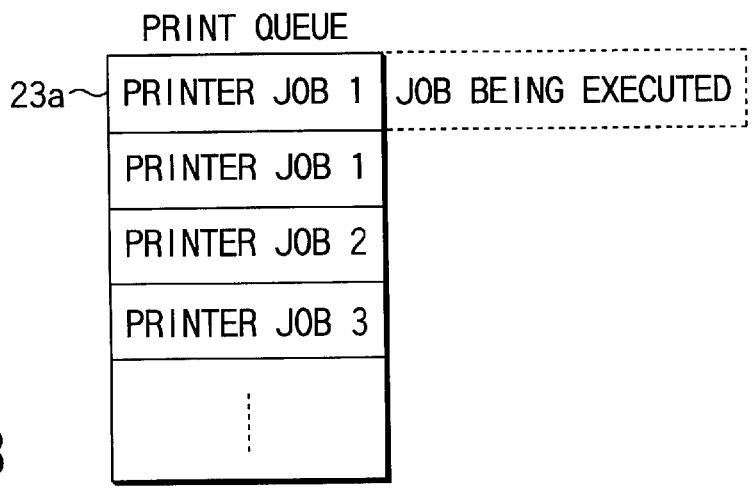
FIG. 8 shows an arrangement of a printing queue.

First, an explanation will be made of the printing queue 23a in the case of rearranging the performing order to jobs. FIGS. 6, 7 and 8 are views for explaining the cases where the jobs present in the printing queue 23a are rearranged in a copying job preferential order.

Let it be assumed that, as shown in FIG. 6, a plurality of printing jobs are registered in the printing queue 23a. A printing request is newly made by a copying job in the printing queue 23a in that state. Then as shown in FIG. 7, the copying job is once registered at the end of the present jobs.

Then in the case where the copying job is registered in the printing queue 23a, the main CPU 11 checks each job in the printing queue 23a. By doing so if it is found that those jobs present in the printing queue 23a are printing jobs, then as shown in FIG. 8, the main CPU 11 rearranges the copying job so as to locate it at the next position of a new performing printing job.

As a result, the new copying job is rearranged such that it is preferentially performed after the currently performing job. In the case where use is made of the printing queue 23a where the order of the jobs is preferentially rearranged, then the jobs involved are taken out at all times in a registered order.

As set out above, the jobs registered in the printing queue are preferentially rearranged each time a new job is requested. By doing so, the jobs can be performed in an order present in the printing queue.

Figure 9:
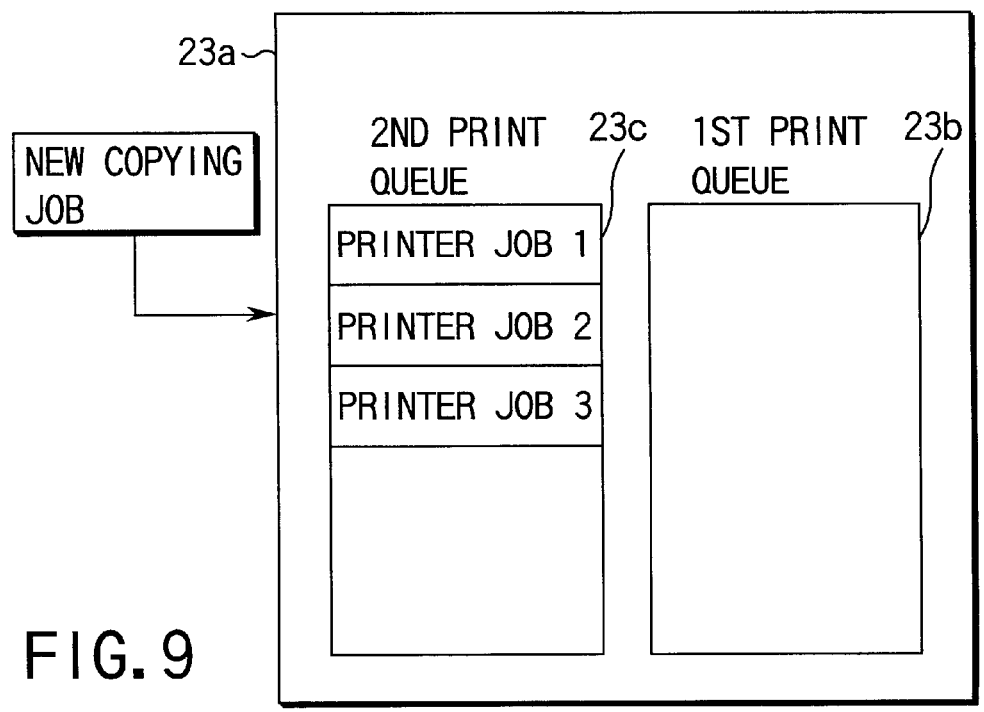
FIG. 9 shows an arrangement of a printing queue.
Figure 10:
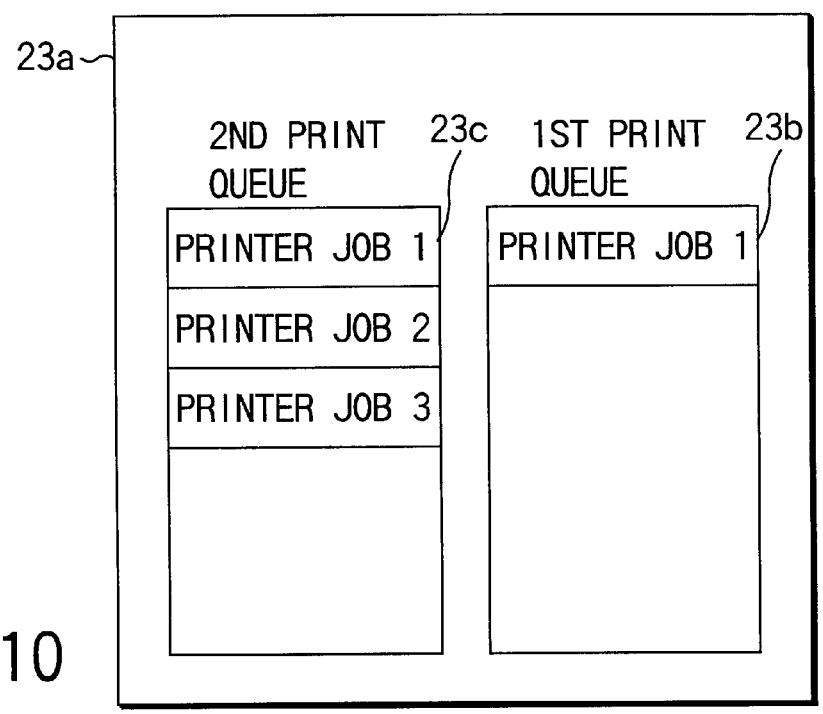
FIG. 10 is a view showing an arrangement of a printing queue.
Figure 6:
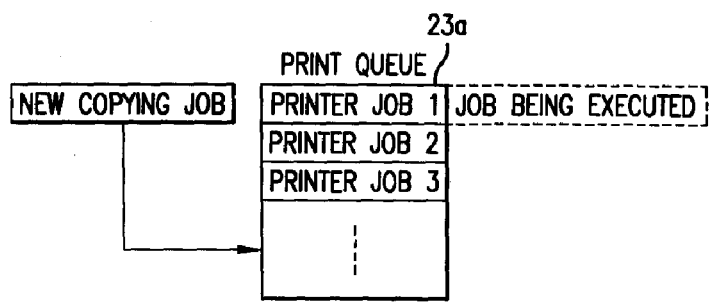
Figure 7:
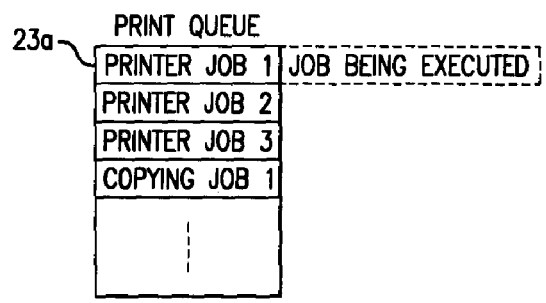
Figure 8:
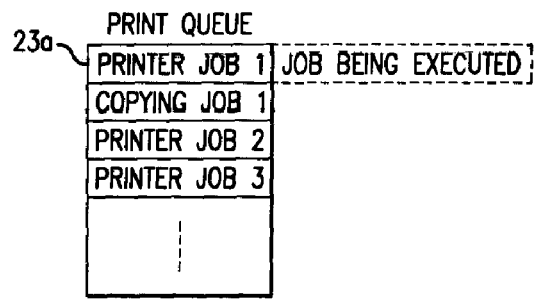

An explanation will be made below about the case of providing the printing queue where a preferentially performing job is registered. FIGS. 9 and 10 show the case of dividing the printing queue 23a into a first printing queue 23b and second printing queue 23c. A preferentially performing copying job is registered in the first printing queue 23b and any other job not given a priority in particular is registered in the second printing queue 23c. As shown in FIG. 9, for example, let it be assumed that a plurality of printing jobs are registered in the printing queue 23c. If, in this state, any job for printing occurs due to the copying job, the main CPU 11 registers the copying job in the printing queue 23b. The job registered in the printing queue 23b is preferentially performed when a job now being performed is ended.

That is, each time any job in the printing queue 23c or printing queue 23b is ended, the main CPU 11 judges whether or not there is any job in the printing queue 23b. When it is judged that the job is registered in the printing queue 23b, the main CPU 11 performs the registered job in the printing queue 23b. When, on the other hand, it is judged that any job is not registered in the printing queue 23b, the main CPU 11 performs jobs registered in the printing queue 23c sequentially.

As set out above, the printing queue is provided in which a preferentially performing job is registered and, when any job is taken out, the job is taken out preferentially from the printing queue in which the preferentially performing job is registered. By doing so, any preferentially performing job can be registered in a printing queue other than that for any other jobs and it is possible to readily control the registering, taking out, etc., of the preferentially performing job.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming method applied to an image forming apparatus having a scanner for reading a document image, an interface for receiving image data via a communication network, a memory for storing image data input by the scanner or interface, a printer for forming the image data on an image forming medium, and an operation panel by which an operation condition of a copying job for reading out a document image to form an image on the image forming medium and a start instruction of the copying job are input, the method comprising:

when the operation condition and start instruction of the copying job are requested with the operation panel, judging, based on the requested operation condition of the copying job, whether the copying job is a sequential type operation condition in which images are formed on the image forming medium by actuating the printer every time image data of a document is input by the scanner, or a completed type operation condition in which after whole image data of all document sheets is stored in the memory by the scanner, the image data is read out from the memory to form images on the image forming medium by the printer;

when said judging judges that the copying job is the sequential type operation condition, determining whether or not the printer is performing image forming processing to image data of another job stored in the memory;

when said determining determines that the printer is performing image forming processing to image data of another job stored in the memory, changing the operation condition of the copying job to the completed type operation condition;

causing the scanner to start read processing of a document image of the copying job under the completed type operation condition; and storing the image data of the copying job read by the scanner in the memory;

wherein when said determining determines that the printer is performing the image forming processing, starting, after the image forming processing is completed, image forming processing of the image data of the copying job stored in the memory by the printer.

2. An image forming method applied to an image forming apparatus having a scanner for reading a document image, an interface for receiving image data via a communication network, a memory for storing image data input by the scanner or interface, a printer for forming the image data on an image forming medium, a printing queue in which data indicative of a job which is being performed by the printer or waiting to be performed is recorded, and an operation panel by which an operation condition of a copying job for reading a document image to form an image on the image forming medium and a start instruction of the copying job are input, the method comprising:

when the operation condition and start instruction of the copying job are requested with the operation panel, judging, based on the requested operation condition of the copying job, whether the copying job is a sequential type operation condition in which images are formed on the image forming medium by actuating the printer every time image data of a document is input by the scanner, or a completed type operation condition in which after whole image data of all document sheets is stored in the memory by the scanner, the image data is read from the memory to form images on the image forming medium by the printer;

registering the copying job along with the judgment result in the printing queue;

when said judging judges that the copying job is the sequential type operation condition, determining whether or not the printer is executing image forming processing to image data of another job stored in the memory in accordance with the presence/absence of the data indicative of another job in the printing queue;

when said determining determines that the printer is executing image forming processing to image data of another job stored in the memory, changing the operation condition of the copying job to the completed type and changing it such that the copying job is executed after the job that is being performed by the printer;

causing the scanner to start read processing of a document image of the copying job under the completed type operation condition; and storing the image data of the copying job read by the scanner in the memory;

wherein when the image forming processing which is being performed by the printer is completed, starting image forming processing of the image data of the copying job stored in the memory by the printer.

3. The image forming method according to claim 2, wherein:

data indicative of a job and an operation condition flag indicating whether the job is the sequential type or completed type are preset in the printing queue;

when the copying job is registered in the printing queue, an operation condition flag indicating whether the copying job is the sequential type or completed type is preset in the printing queue based on the judgment result; and when the operation condition of the copying job is changed to the completed type, indication of the operation condition flag of the copying job is changed from the sequential type operation condition to the completed type operation condition.

4. The image forming method according to claim 2, wherein:
the printing queue comprises a first printing queue in which data indicative of processing preferentially performed is recorded and a second printing queue in which data indicative of other processing is recorded; and
the copying job is registered in the first printing queue.

5. An image forming apparatus comprising:
a scanner for reading a document image;
an interface for receiving image data via a communication network;
a memory for storing image data input by the scanner or interface;
a printer for forming the image data on an image forming medium;
an operation panel by which an operation condition of a copying job for reading out a document image to form an image on the image forming medium and a start instruction of the copying job are input; and
a controller configured for:
judging, when the operation condition and start instruction of the copying job are requested with the operation panel, based on the requested operation condition of the copying job, whether the copying job is a sequential type operation condition in which images are formed on the image forming medium by actuating the printer every time image data of a document is input by the scanner, or a completed type operation condition in which after whole image data of all document sheets is stored in the memory by the scanner, the image data is read out from the memory to form images on the image forming medium by the printer;
determining, when said judging judges that the copying job is the sequential type operation condition, whether or not the printer is performing image forming processing to image data of another job stored in the memory;
changing the operation condition of the copying job to the completed type operation condition when said determining determines that the printer is performing image forming processing to image data of another job stored in the memory;
causing the scanner to start read processing of a document image of the copying job under the completed type operation condition; and
storing the image data of the copying job read by the scanner in the memory;
wherein when said determining determines that the printer is performing the image forming processing, starting image forming processing to the image data of the copying job stored in the memory by the printer after the image forming processing is completed.

6. An image forming apparatus comprising:
a scanner for reading a document image;
an interface for receiving image data via a communication network;
a memory for storing image data input by the scanner or interface;
a printer for forming the image data on an image forming medium,
a printing queue in which data indicative of a job which is being performed by the printer or waiting to be performed is recorded;
an operation panel by which an operation condition of a copying job for reading a document image to form an image on the image forming medium and a start instruction of the copying job are input; and
a controller configured for:
judging, when the operation condition and start instruction of the copying job are requested with the operation panel, based on the requested operation condition of the copying job, whether the copying job is a sequential type operation condition in which images are formed on the image forming medium by actuating the printer every time image data of a document is input by the scanner, or a completed type operation condition in which after whole image data of all document sheets is stored in the memory by the scanner, the image data is read from the memory to form images on the image forming medium by the printer;
registering the copying job along with the judgment result in the printing queue;
determining, when said judging judges that the copying job is the sequential type operation condition, whether or not the printer is executing image forming processing to image data of another job stored in the memory in accordance with the presence/absence of the data indicative of another job in the printing queue;
changing the operation condition of the copying job to the completed type and changing it such that the copying job is executed after the job that is being performed by the printer when said determining determines that the printer is executing image forming processing to image data of another job stored in the memory;
causing the scanner to start read processing of a document image of the copying job under the completed type operation condition; and
storing the image data of the copying job read by the scanner in the memory; and
starting image forming processing to the image data of the copying job stored in the memory by the printer when the image forming processing which is being performed by the printer is completed.

* * * * *

UNITED STATES PATENT AND TRADEMARK OFFICE
CERTIFICATE OF CORRECTION

PATENT NO.   : 6,816,273 B1
DATED        : November 9, 2004
INVENTOR(S)  : Masato Kuga and Shingo Shiramura It is certified that error appears in the above-identified patent and that said Letters Patent is hereby corrected as shown below:

Drawings,
Please replace Formal Drawings Sheet for Figures 6, 7 and 8 with the attached.

Signed and Sealed this

First Day of March, 2005

JON W. DUDAS
*Director of the United States Patent and Trademark Office*